United States Patent
Fuchs et al.

(10) Patent No.: US 7,490,527 B2
(45) Date of Patent: Feb. 17, 2009

(54) DEVICE FOR CONTROLLING AN AUTOMATIC GEARBOX

(75) Inventors: Emanuel Fuchs, Rochester, MI (US); Frank Gielisch, Karlsfeld (DE); Cedric Dubreuil, Aureille (FR); Eva-Farangis Rahimi-Nedjat, Heppenheim (DE); Tobias Falck, Munich (DE)

(73) Assignee: Bayerische Motoren Werke Aktiengesellscaft, Munich (DE)

( * ) Notice: Subject to any disclaimer, the term of this patent is extended or adjusted under 35 U.S.C. 154(b) by 0 days.

(21) Appl. No.: 11/790,060

(22) Filed: Apr. 23, 2007

(65) Prior Publication Data
US 2007/0219046 A1 Sep. 20, 2007

Related U.S. Application Data

(63) Continuation of application No. PCT/EP2005/008553, filed on Aug. 6, 2005.

(30) Foreign Application Priority Data
Oct. 23, 2004 (DE) .................. 10 2004 051 639

(51) Int. Cl.
*F16H 59/00* (2006.01)
*F16H 61/00* (2006.01)
*F16H 63/00* (2006.01)

(52) U.S. Cl. .................. 74/335; 74/473.18; 74/473.19; 74/473.3; 74/473.32; 74/473.33

(58) Field of Classification Search .................. 74/335, 74/473.1, 473.12, 473.18, 473.19, 473.3, 74/473.32, 473.33
See application file for complete search history.

(56) References Cited

U.S. PATENT DOCUMENTS

| 5,819,585 | A | 10/1998 | Darnell |
| 6,035,735 | A | 3/2000 | Graf et al. |
| 6,053,066 | A * | 4/2000 | Ishii et al. ................. 74/473.18 |
| RE37,513 | E * | 1/2002 | Tabata et al. .................. 477/96 |
| 6,353,787 | B2 * | 3/2002 | Nishiyama ................... 701/93 |
| 6,363,805 | B1 | 4/2002 | Marchart |
| 7,029,421 | B2 | 4/2006 | Henneken et al. |
| 2003/0228953 | A1 * | 12/2003 | Aoki et al. .................... 477/44 |
| 2004/0225430 | A1 | 11/2004 | Bothe et al. |

FOREIGN PATENT DOCUMENTS

DE 39 24 318 A1 1/1991

(Continued)

OTHER PUBLICATIONS

International Search Report dated Oct. 13, 2005 with English translation of relevant portion (Six (6) pages).

(Continued)

*Primary Examiner*—David D. Le
(74) *Attorney, Agent, or Firm*—Crowell & Moring LLP

(57) ABSTRACT

A control system for an automatically shifting transmission is described. A direct upshifting or downshifting starting from the automatic mode is permitted, by using a corresponding programming of the electronic control device when a certain selecting device is operated, without transition into the manual mode taking place. A gear change following this upshifting or downshifting is implemented, corresponding to the shifting logic of the automatic mode. In the case of a multiple operation, multiple direct upshifts or downshifts can also be permitted, without leaving the automatic mode.

12 Claims, 1 Drawing Sheet

FOREIGN PATENT DOCUMENTS

| | | |
|---|---|---|
| DE | 41 19 076 A1 | 12/1991 |
| DE | 197 36 406 A1 | 3/1999 |
| DE | 197 55 096 A1 | 6/1999 |
| DE | 199 12 963 A1 | 9/2000 |
| DE | 101 25 698 A1 | 11/2002 |
| DE | 101 57 393 A1 | 6/2003 |
| EP | 1 304 511 A1 | 4/2003 |
| FR | 2 699 978 A1 | 7/1994 |
| WO | WO 96/32299 A1 | 10/1996 |
| WO | WO 2005/085682 A1 | 9/2005 |

OTHER PUBLICATIONS

German Office Action dated Jul. 8, 2005 with English translation of relevant portion (Seven (7) pages).

European Office Action dated Oct. 4, 2007 with English translation (Eight (8) pages).

* cited by examiner

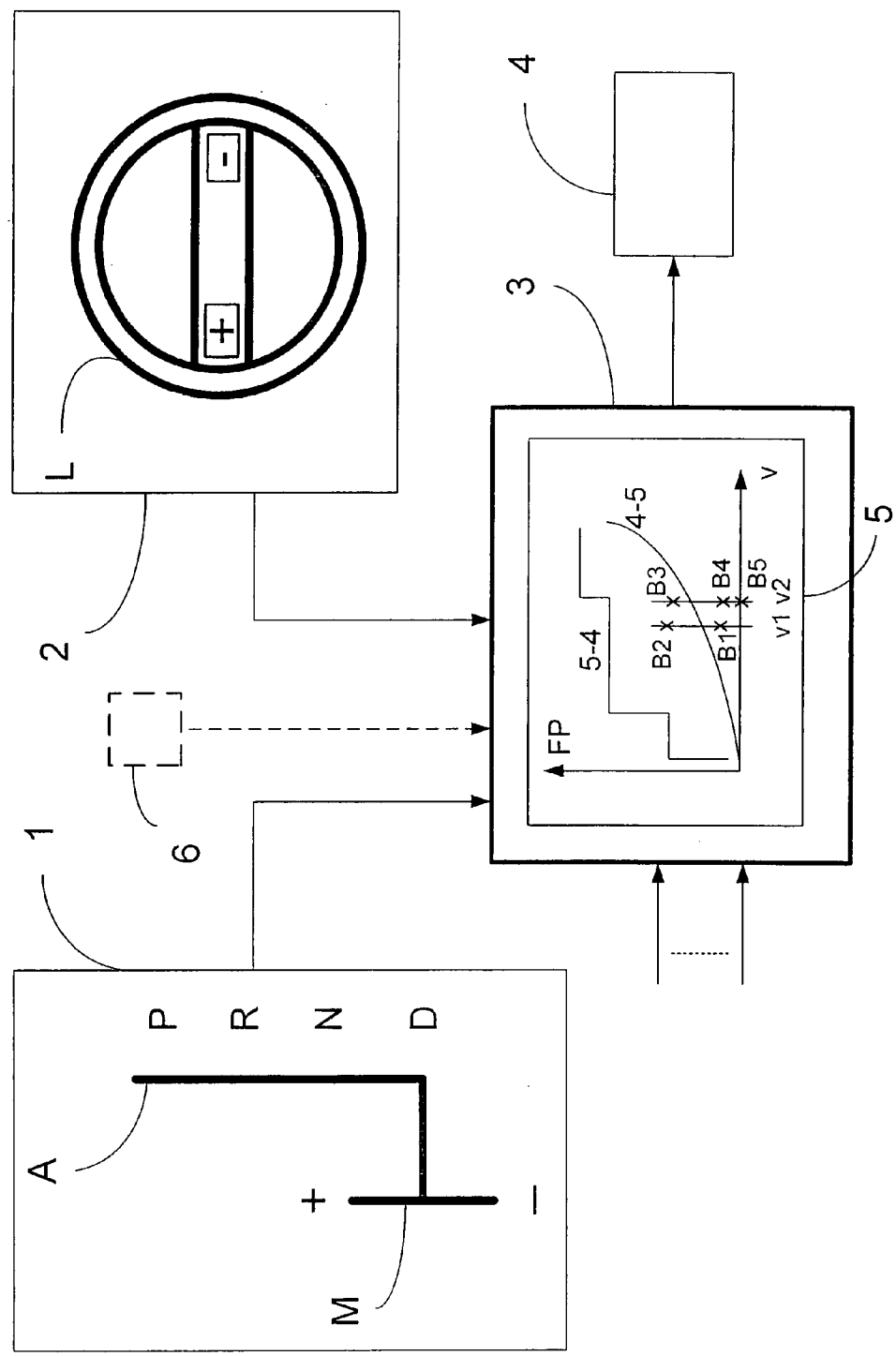

DEVICE FOR CONTROLLING AN AUTOMATIC GEARBOX

CROSS REFERENCE TO RELATED APPLICATIONS

This application is a continuation of PCT International Application No. PCT/EP2005/008553, filed Aug. 6, 2005, which claims priority under 35 U.S.C. § 119 to German Patent Application No. 10 2004 051 639.1, filed Oct. 23, 2004, the entire disclosures of which are herein expressly incorporated by reference.

BACKGROUND AND SUMMARY OF THE INVENTION

The invention relates to a system for controlling an automatically shifting transmission having a first selecting device for fixing adjustable drive positions in an automatic mode, and a second selective device for triggering direct upshifting and/or downshifting.

Such a system is known, for example, from German Patent Document DE 197 36 406 A1. This system has a first selecting device in the form of a selector lever by which the drive positions P, R, N, D can be fixed, and which can be adjusted in an automatic mode. Using a second selecting device in the form of a steering wheel having two switches, the gears of the transmission can be manually shifted up or down in steps in a manual mode. The known system has an electronic transmission control device which is customary in the case of automatic transmissions or automated manual transmissions. According to the system known from German Patent Document DE 197 36 406 A1, that the manual mode is activated with the operation of the second selecting device starting from the automatic mode. This manual mode is maintained until situations are detected in which the automatic mode is desirable.

During a transition from the manual mode to the automatic mode, gear change operations may be carried out by the known system that are not expected by the driver. On the one hand, a transition to the automatic mode after the manual mode had been maintained for a fairly long time cannot be comprehended or expected by the driver. On the other hand, the software modules in the control device which are assigned to the two modes are not mutually coordinated, so that uncomfortable gear change operations may occur. Maintaining the manual mode for a given time is particularly disadvantageous because, after the expiration of the given time, certain shifting operations, which are not yet concluded, possibly have to be interrupted. Furthermore, a change from an automatic mode to the manual mode and back involves further interface functionalities or special complementary functions, such as the gear display or the further development of automatic upshifts/downshifts at rotational speed limits, and others.

The embodiments of the invention provide a comfort-optimized shifting strategy for automatic or automated transmissions, which may be achieved by starting in the automatic mode when the second selecting device are provided, and although a direct upshifting or downshifting is permitted, the automatic mode is maintained such that a gear change following this upshifting or downshifting is carried out corresponding to the shifting logic of the automatic mode. Advantageous further developments are described further below.

By using the system according to the invention, particularly by using a corresponding programming of the electronic control device when operating the second selecting device starting from the automatic mode, a direct upshifting or downshifting is permitted, in which case, however, no transition takes place into the manual mode.

A gear change following this upshifting or downshifting is carried out corresponding to the shifting logic of the automatic mode. In the case of a multiple operation of the second selecting device, multiple direct upshifts and downshifts respectively may also be permitted but always without leaving the automatic mode. The reason is that only the shifting logic on which the automatic mode is based also monitors operating parameters which have to be taken into account particularly with respect to comfort during gear shift operations. The second selecting device may also be a sports key or another key by which, corresponding to at least its functional configuration, an upshifting or downshifting is triggered arbitrarily.

Preferably, it is provided that, starting from the automatic mode before the operation of the second selecting device, another operating element has to be actuated in order to shift over into the manual mode. However, if the second selecting device is operated without any previous operation of the other operating element, the above-mentioned function is initiated.

Preferably, the duration of the operation of the second selecting device can be detected and the gear engagement on the basis of the directly permitted upshifting or downshifting can be maintained at least for the duration of the operation of the second selecting device. According to this further development of the invention, the driver can deliberately determine the minimum duration of maintaining this gear.

In a further embodiment of the invention, the shifting logic of the automatic mode contains a gear change prevention which, after the implementation of a gear change, or in this exemplary case after the implementation of the upshifting or downshifting triggered by the second selecting device, until a defined event is present, prevents another gear change when the latter is predefined according to the characteristic shifting curves present in the shifting logic. As a result, pendulum shifting is prevented.

A defined event is, for example, first a change of a power demand signal and/or of the vehicle velocity after an upshifting or downshifting carried out by operating the second selecting device.

The defined event is or preferably includes also the falling below a predefined threshold value with respect to the change of the power demand signal and/or of the vehicle velocity.

This preferably requires that, after the upshifting or downshifting carried out by the operation of the second selection device, a waiting first takes place for a change of the power demand signal and/or of the vehicle velocity. The reason is that otherwise the gear change prevention would not be effective if the power demand signal and the vehicle velocity were to remain constant, which could result in an undesirable pendulum shifting. A defined event is therefore preferably first the waiting for a change of the power demand signal and/or of the vehicle velocity and the subsequent falling below a predefined threshold value with respect to the change of the power demand signal and/or of the vehicle velocity.

In this exemplary embodiment, only the amount of the change, not the direction of the change plays a role. A power demand signal may, for example, be a request of a driver assistance system for tractive power or an accelerator pedal angle or a signal proportional to the braking pressure from which, in each case, the positive or negative tractive force wish of the driver can be determined. This further development is mainly relevant in connection with the driver's acceleration wish, after which normally a leveling-out to a new steady-state operating point takes place. For this purpose, the driver normally desires a downshift and simultaneously depresses the accelerator pedal. Thus, as long as the accelerator pedal angle changes in a predefined tolerance band and a steady-state operating point is therefore not reached, a gear shift is prevented according to the invention. Here also, the avoidance of undesired pendulum shifts is in the foreground.

Other objects, advantages and novel features of the present invention will become apparent from the following detailed description of the invention when considered in conjunction with the accompanying drawings.

BRIEF DESCRIPTION OF THE DRAWINGS

The invention will be explained in detail with reference to an exemplary embodiment.

FIG. 1 is a schematic overview of an overall arrangement for controlling a gearbox according to the invention.

DETAILED DESCRIPTION OF THE DRAWINGS

FIG. 1 illustrates a system for controlling an automatic transmission 4 for a motor vehicle having a first selecting device 1 in the form of a selector lever which is not shown and which can be moved in a first channel for fixing the drive positions P, R, N and D which can be adjusted in an automatic mode A. Furthermore, a second selecting device 2 is shown in the form of an upshift key (+ key) and a downshift key (− key) by which, in a manual mode M, the gears of the transmission can be manually upshifted or downshifted in steps. This can be accomplished if, starting from the automatic mode A, before the operation of the second selecting device 2 another operating element, for example, the selecting device 1, was operated for changing over into the manual mode M. In the illustrated embodiment, to change over into the manual mode M, the selecting device 1 has to be moved at least into the second channel, in which the gears of the transmission may also be manually upshifted or downshifted in steps by using an upshift and downshift key.

Furthermore, an electronic control device 3 is present which receives various input signals, including the signals of the selecting devices 1 and 2. As a function of these input signals, by using a programmed shifting logic, the control elements of the automatic transmission 4 are controlled for changing and engaging predefined gears.

When the second selecting device 2 is operated without a preceding operation of the other operating element 1, which is provided for the change-over into the manual mode M, a direct upshifting or downshifting is carried out. The engaged gear is preferably maintained at least for the duration of the operation of the second selecting device 2 or of the upshift key or the downshift key if the keys are further developed such that the duration of their operation can be detected. However, the automatic mode A is maintained.

The automatic mode A may comprise several modes by which an automatic gear change can be carried out. This may, for example, be an especially fuel-saving mode (E-mode) or a sporty mode (S-mode). Thus, with the operation of the second selecting device 2, a change-over can also take place between the existing automatic modes (E, S). However, for reasons of comfort, a change-over into the manual mode does not take place. For example, when the second selecting device 2 is operated, simultaneously with a direct downshifting, a change-over into a more sporty automatic mode can also take place, which may be advantageous particularly during passing maneuvers.

A gear change following this upshifting or downshifting is carried out corresponding to a shifting logic of the automatic mode A. The shifting logic of the automatic mode A preferably contains a gear change prevention which after the implementation of the upshifting or downshifting triggered by the second selecting device 2 until a defined event is present, prevents a further gear change if the latter is predefined according to the characteristic shifting curves 5 present in the shifting logic. The defined event may be for example the falling below a predefined threshold value of the absolute value of the change of a power demand signal in the form of the accelerator pedal angle FP and/or of the vehicle velocity v after a change was awaited and detected beforehand.

Using the characteristic shifting curves 5, which are illustrated only schematically using operating points B1 to B5, an acceleration operation according to the invention is illustrated in detail. A characteristic downshifting curve 5-4 is illustrated according to which a downshifting can be initiated from the fifth into the fourth gear. Furthermore, a characteristic upshifting curve 4-5 is illustrated according to which an upshifting can be initiated from the fourth into the fifth gear. A hysteresis range is provided between the two characteristic curves. Starting from an automatic mode A, in operating point B1, a downshifting from the fifth into the fourth gear is carried out with the operation of the selecting device 2 by the control device 3 without any change-over into the manual mode M in the presence of a low accelerator pedal angle FP and an actual vehicle velocity v1. In addition, the control device 3 can carry out a change-over from an economical automatic mode (E-mode) automatically into a sporty automatic mode (S-mode).

If, after the downshifting into the fourth gear, the operating point B1 were to be maintained at which, according to the characteristic upshifting curve 4-5, the $5^{th}$ gear would have to be engaged, according to the invention, a gear change prevention (here, an upshift prevention) is activated until the operating point, characterized by an accelerator pedal angle FP and a vehicle velocity v, changes. For this purpose, minimum change thresholds can be defined with respect to the change of the accelerator pedal angle and/or of the vehicle velocity.

In the present example, however, the accelerator pedal angle FP is to be increased by the driver simultaneously with the operating of the selecting device 2, so that a changed operating point B2 is obtained. According to the shifting logic of the automatic mode A, the operating point B2 is in the hysteresis range in which no subsequent gear change is carried out anyhow. In a further operating point B3, the accelerator pedal angle FP has slightly decreased and the vehicle velocity v has increased to a new value v2. According to the shifting logic, no gear change takes place yet also in operating point B3. In the next operating point B4, the accelerator pedal angle FP has decreased such that, according to the characteristic upshifting curve 4-5, a gear change is predefined from the fourth into the fifth gear. However, the shifting logic in the automatic mode takes into account not only the characteristic shifting curves 5 but particularly also the course of the accelerator pedal angle FP. A gear change into the fifth gear is prevented until the accelerator pedal angle FP substantially no longer changes. However, in this case, the automatic mode A can continue to prevent a gear change in a known manner, here particularly an upshifting, if the accelerator pedal angle FP is zero (operating point B5) because, for this special case of the steady-state operating point B5, a deceleration wish by the driver is assumed.

In another exemplary embodiment, as an alternative or in addition to the selecting device 2, for example, a selecting device 6 in the form of a sports key can be provided, by which the same function can be triggered as by using the – key of the selecting device 2 for triggering a downshifting.

This system according to the invention, on the one hand, takes into account the driver's power wish and, on the other hand, also the demand for optimal comfort. An easy operation is achieved, on the one hand, but, on the other hand, a gear change operation is also achieved which is as free of jerking as possible.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system for controlling an automatically shifting transmission for a motor vehicle, comprising:
    a first selecting device for selecting drive positions adjustable in an automatic mode;
    a second selecting device for triggering one of a direct upshifting and downshifting of the transmission;
    an electronic control device controlling, as a function of signals of the first and second selecting devices and further input signals, control elements of the transmission;
    wherein the electronic control device, when the second selecting device is operated starting from the automatic mode, permits one of the direct upshifting and downshifting, while maintaining the automatic mode to carry out a gear change, following one of the direct upshifting and downshifting, corresponding to a shifting logic of the automatic mode.

2. The system according to claim 1, wherein, starting from the automatic mode, before operation of the second selecting device to manually upshift and downshift in steps gears of the transmission in a manual mode, another operating element has to be operated for changing over into the manual mode, and wherein, when the second selecting device is operated without the prior operation of the another operating element, a direct upshifting and downshifting is permitted while maintaining the automatic mode, and a gear change following the upshifting and downshifting is carried out corresponding to the shifting logic of the automatic mode.

3. The system according to claim 1, wherein a duration of operation of the second selecting device is detected, and wherein a gear engaged as a result of the directly permitted upshifting and downshifting is maintained at least for the duration of operation of the second selecting device.

4. A system for controlling an automatically shifting transmission for a motor vehicle, comprising:
    a first selecting device for selecting drive positions adjustable in an automatic mode;
    a second selecting device for triggering one of a direct upshifting and downshifting of the transmission;
    an electronic control device controlling, as a function of signals of the first and second selecting devices and further input signals, control elements of the transmission;
    wherein the electronic control device, when the second selecting device is operated starting from the automatic mode, permits one of the direct upshifting and downshifting, and maintains the automatic mode to carry out a gear change, following one of the upshifting and downshifting, corresponding to a shifting logic of the automatic mode, and
    the shifting logic of the automatic mode includes a gear change prevention which, until a defined event is present, prevents a further gear change when this gear change is predefined according to characteristic shifting curves of the shifting logic.

5. The system according to claim 4, wherein, after one of upshifting and downshifting carried out as a result of operation of the second selecting device, a delay takes place waiting for a change of one of a power demand signal and of a vehicle velocity, as the defined event.

6. The system according to claim 5, wherein the defined event comprises a subsequent falling below a predefined threshold value with respect to one of a change of the power demand signal and of the vehicle velocity.

7. A method of controlling an automatically shifting transmission, comprising the acts of:
    receiving in an electronic control device from a first selecting device a drive position signal corresponding to an automatic mode of the transmission;
    receiving in the electronic control device from a second selecting device a signal for triggering one of a direct upshifting and downshifting of the transmission; and
    permitting one of the direct upshifting and downshifting in response to the signal from the second selecting device, while maintaining the automatic mode of the transmission to carry out gear changes corresponding to a shifting logic of the automatic mode, following the one of the direct upshifting and downshifting.

8. The method according to claim 7, further comprising the act of maintaining a gear engagement resulting from one of the direct upshifting and downshifting for at least a duration of operation of the second selecting device.

9. The method according to claim 7, further comprising the acts of receiving in the electronic control device a signal from another operating element before permitting a change over from the automatic mode to a manual mode of the transmission.

10. The method according to claim 9, further comprising, when the signal from the another operating element is not received, maintaining the transmission in the automatic mode and carrying out one of the direct upshifting and downshifting following the shifting logic of the automatic mode.

11. The method according to claim 7, further comprising, in the automatic mode of the transmission, preventing a further gear change predefined according to characteristic shifting curves of a shifting logic, until a defined event occurs.

12. The method according to claim 11, wherein the defined event comprises a change in at least one of a power demand signal and a vehicle velocity.

* * * * *